(12) United States Patent
Hashimoto (10) Patent No.: US 7,979,799 B2
(45) Date of Patent: Jul. 12, 2011

(54) IMAGE DISPLAY APPARATUS AND DISPLAY METHOD FOR AN IMAGE DISPLAY APPARATUS

(75) Inventor: Hiroyuki Hashimoto, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 723 days.

(21) Appl. No.: 12/071,464

(22) Filed: Feb. 21, 2008

(65) Prior Publication Data
US 2008/0209359 A1 Aug. 28, 2008

(30) Foreign Application Priority Data
Feb. 28, 2007 (JP) ................ 2007-048864

(51) Int. Cl.
G06F 3/00 (2006.01)
G06F 3/048 (2006.01)
G09F 5/00 (2006.01)
(52) U.S. Cl. ........ 715/718; 715/810; 715/811; 715/761; 345/1.1
(58) Field of Classification Search .............. 715/811, 715/718, 761; 345/1.1
See application file for complete search history.

(56) References Cited

U.S. PATENT DOCUMENTS

| 7,035,527 B2* | 4/2006 | Mao et al. ................ 386/69 |
| 7,395,267 B2* | 7/2008 | Hilbert et al. ............ 707/827 |
| 2002/0122075 A1* | 9/2002 | Karasawa et al. .......... 345/846 |
| 2006/0188096 A1* | 8/2006 | Aguilar ................... 380/200 |
| 2007/0035768 A1* | 2/2007 | Park et al. ............. 358/1.15 |
| 2007/0091096 A1* | 4/2007 | Wang et al. ............... 345/501 |

FOREIGN PATENT DOCUMENTS

| JP | A-2001-331615 | 11/2001 |
| JP | A-2005-045434 | 2/2005 |
| JP | A-2006-146348 | 6/2006 |

* cited by examiner

Primary Examiner — Tadeese Hailu
Assistant Examiner — Nicholas S Ulrich
(74) Attorney, Agent, or Firm — Oliff & Berridge PLC (57) ABSTRACT

A computer connectable image display apparatus for presentation is provided. The image display apparatus has a candidate information obtaining unit, a selection screen display unit, a presentation execution instruction unit, and a drawing screen display unit. The candidate information obtaining unit obtains selection candidate information generated by the computer relating selection candidates for a presentation subject file. The selection screen display unit generates and displays a selection screen for selecting the presentation subject file based on the selection candidate information. The presentation execution instruction unit makes the computer to execute the selected presentation subject file by sending selection results with the selection screen. The drawing screen display unit captures and displays a computer drawing screen drawn by the computer. The image display apparatus displays the selection screen without displaying the computer drawing screen when a connection with the computer is established, and displays the computer drawing screen when drawing by the computer executing the selected presentation subject file is started.

5 Claims, 6 Drawing Sheets

HISTORICAL USAGE DATA

| FILE NAME | EXTENSION | CREATOR | CREATION TIME AND DATE | FINAL ACCESS |
|---|---|---|---|---|
| DEVELOPMENT PLAN | doc | ICHIRO YAMADA | 01/23/07, 09:15 | 02/01/07, 13:37 |
| PRESENTATION 1 | ppt | ICHIRO YAMADA | 12/12/06, 15:30 | 02/01/07, 11:20 |
| ESTIMATE FORM (OX INDUSTRIES) | xls | HANAKO SUZUKI | 01/15/07, 14:25 | 01/31/07, 17:04 |
| DEVELOPMENT SCHEDULE | xls | ICHIRO YAMADA | 01/28/07, 19:03 | 01/31/07, 14:38 |
| ESTIMATE FORM (△□CORP.) | xls | HANAKO SUZUKI | 01/18/07, 16:59 | 01/31/07, 10:56 |
| PRESENTATION 2 | ppt | ICHIRO YAMADA | 12/14/06, 10:52 | 01/30/07, 19:45 |
| BUDGET ESTIMATE | xls | ICHIRO YAMADA | 01/25/07, 18:24 | 01/30/07, 13:23 |
| PRESENTATION 3 | ppt | ICHIRO YAMADA | 01/08/07, 15:48 | 01/30/07, 11:21 |

HISTORICAL USAGE DATA

| FILE NAME | EXTENSION | CREATOR | CREATION TIME AND DATE | FINAL ACCESS |
|---|---|---|---|---|
| DEVELOPMENT PLAN | doc | ICHIRO YAMADA | 01/23/07, 09:15 | 02/01/07, 13:37 |
| ~~PRESENTATION 1~~ | ~~ppt~~ | ~~ICHIRO YAMADA~~ | ~~12/12/06, 15:30~~ | ~~02/01/07, 11:20~~ |
| ESTIMATE FORM (OX INDUSTRIES) | xls | HANAKO SUZUKI | 01/15/07, 14:25 | 01/31/07, 17:04 |
| DEVELOPMENT SCHEDULE | xls | ICHIRO YAMADA | 01/28/07, 19:03 | 01/31/07, 14:38 |
| ESTIMATE FORM (△□ CORP.) | xls | HANAKO SUZUKI | 01/18/07, 16:59 | 01/31/07, 10:56 |
| ~~PRESENTATION 2~~ | ~~ppt~~ | ~~ICHIRO YAMADA~~ | ~~12/14/06, 10:52~~ | ~~01/30/07, 19:45~~ |
| BUDGET ESTIMATE | xls | ICHIRO YAMADA | 01/25/07, 18:24 | 01/30/07, 13:23 |
| ~~PRESENTATION 3~~ | ~~ppt~~ | ~~ICHIRO YAMADA~~ | ~~01/08/07, 15:48~~ | ~~01/30/07, 11:21~~ |

Fig.4B

EXTRACTED CANDIDATES

| FILE NAME | EXTENSION | CREATOR | CREATION TIME AND DATE | FINAL ACCESS |
|---|---|---|---|---|
| ~~PRESENTATION 1~~ | ~~ppt~~ | ~~ICHIRO YAMADA~~ | ~~12/12/06, 15:30~~ | ~~02/01/07, 11:20~~ |
| PRESENTATION 2 | ppt | ICHIRO YAMADA | 12/14/06, 10:52 | 01/30/07, 19:45 |
| PRESENTATION 3 | ppt | ICHIRO YAMADA | 01/08/07, 15:48 | 01/30/07, 11:21 |

PRESENTATION START

IMAGE DISPLAY APPARATUS AND DISPLAY METHOD FOR AN IMAGE DISPLAY APPARATUS

CROSS-REFERENCE TO RELATED APPLICATIONS

The present application claims the priority based on Japanese Patent Application No. 2007-48864 filed on Feb. 28, 2007, the disclosure of which is hereby incorporated herein by reference in its entirety.

BACKGROUND OF THE INVENTION

1. Field of the Invention

This invention relates to technology for displaying a presentation subject file with an image display apparatus for presentation.

2. Description of the Related Art

With the image display apparatus for presentation such as a projector, an image is displayed according to a video signal supplied from a computer. In recent years, image data is supplied from the computer to the display apparatus via a data communication link, which complies with a standard such as Universal Serial Bus (USB) and IEEE 1394, or local area network (LAN). The display apparatus displays an image according to the supplied image data.

From the computer to the image display apparatus, video signals and image data which represent an image as is displayed on the computer display are supplied. Because of this, by the image display apparatus, an operating screen on the computer is displayed as it is. If the contents of the operating screen are displayed by the projector in this way, there is case that information which is not desirable to display with the image display apparatus for presentations may be displayed.

SUMMARY OF THE INVENTION

An object of the present invention is to suppress the display of information for which display is undesirable with the image display apparatus for presentation.

According to an aspect of the present invention, a computer connectable image display apparatus for presentation is provided. The image display apparatus has: a candidate information obtaining unit configured to obtain selection candidate information relating to one or more selection candidates for a presentation subject file, the selection candidate information being generated by the computer; a selection screen display unit configured to generate and display a selection screen for selecting the presentation subject file based on the selection candidate information, the selection candidate information obtained by the candidate information obtaining unit; a presentation execution instruction unit configured to make the computer to execute the selected presentation subject file by sending selection results with the selection screen to the computer; and a drawing screen display unit configured to capture and display a computer drawing screen drawn by the computer, wherein the image display apparatus displays the selection screen without displaying the computer drawing screen when a connection with the computer is established, and displays the computer drawing screen when drawing by the computer executing the selected presentation subject file is started.

With this configuration, the selection of the presentation subject image file is performed when the selection screen generated based on the selection candidate information is displayed, without displaying the computer drawing screen. Because of this, it is possible to reduce the possibility that the image display apparatus displays information not necessary for the selection of a file, and to suppress the display of information undesirable to display with the image display apparatus.

The present invention may be implemented in various embodiments. For example, it can be implemented as an image display apparatus and a display method therein; a control device and a control method of the image display apparatus; a computer program that realizes the functions of those image display apparatus, display method, control device and control method; a recording medium having such a computer program recorded thereon; and a data signal embedded in carrier waves including such a computer program.

These and other objects, features, aspects, and advantages of the present invention will become more apparent from the following detailed description of the preferred embodiments with the accompanying drawings.

DESCRIPTION OF THE PREFERRED EMBODIMENT

A. Embodiment

Figure 1:
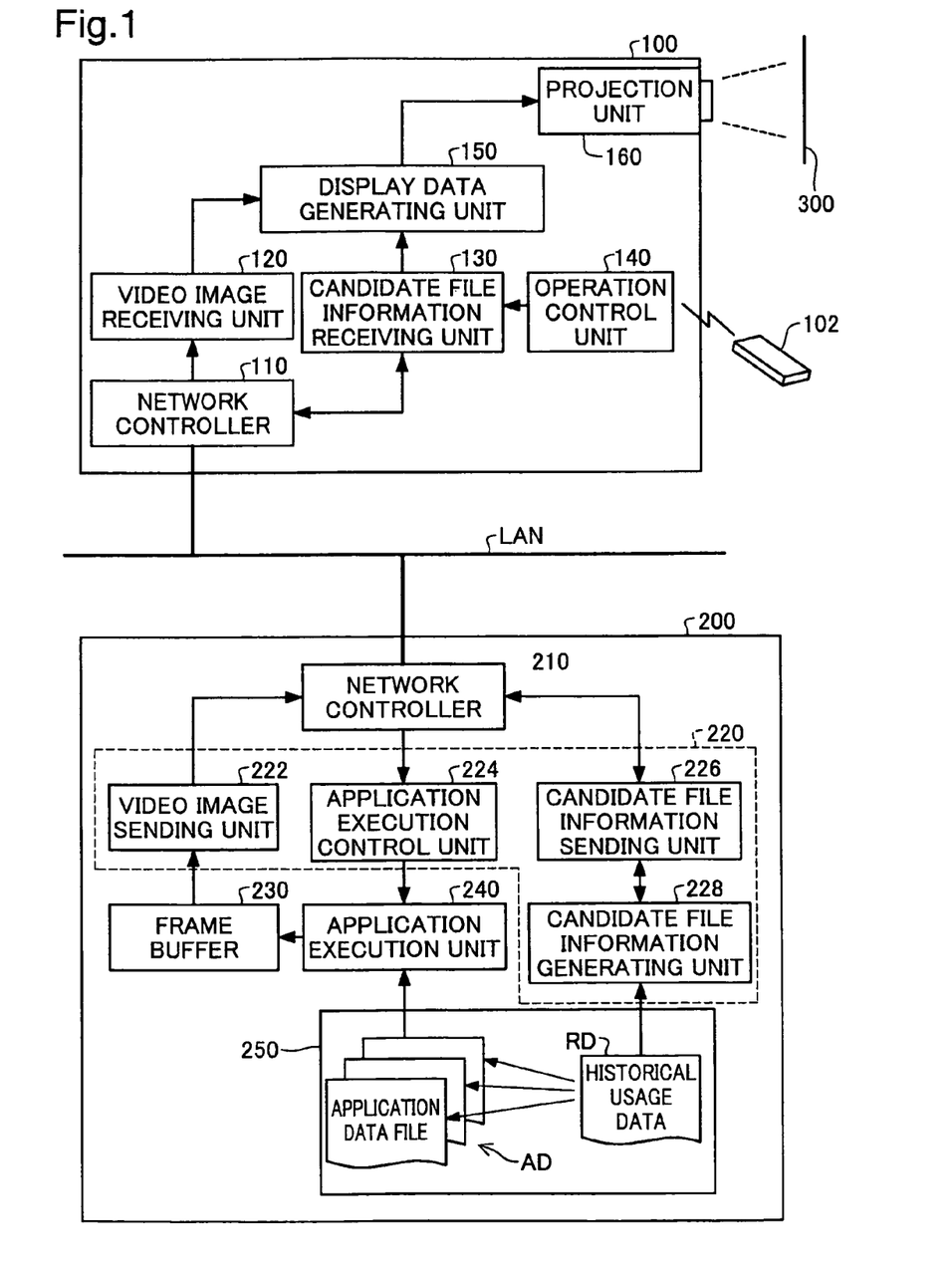
FIG. 1 is an explanatory drawing showing the configuration of an image projection system as an embodiment of the present invention.

FIG. 1 is an explanatory drawing showing the configuration of an image projection system as an embodiment of the present invention. The image projection system includes a projector 100 and a personal computer 200. The projector 100 and the personal computer 200 are connected to a local area network (LAN). In this embodiment, both of the projector 100 and the personal computer 200 are configured as network devices compatible with Universal Plug and Play (UPnP: UPnP is a trademark of UPnP Implementers Corporation).

The projector 100 has a network controller 110, a video image receiving unit 120, a candidate file information receiving unit 130, an operation control unit 140, a display data generating unit 150, and a projection unit 160. Functions of these units are realized by a CPU, ROM and RAM which are provided with the projector 100. The network controller 110 connected to the LAN is connected to both of the video image receiving unit 120 and the candidate file information receiving unit 130. The network controller 110 mediates the sending and receiving of data between the LAN, and the video image receiving unit 120 and the candidate file information receiving unit 130.

The video image receiving unit 120 receives image data via the network controller 110, and supplies the received image data to the display data generating unit 150. From the image data supplied from the video image receiving unit 120, the display data generating unit 150 generates display data representing the image displayed by the projector 100.

The candidate file information receiving unit 130 receives candidate file information from the network controller 110, and supplies the received candidate file information to the display data generating unit 150. The display data generating unit 150 generates display data from the candidate file information supplied from the candidate file information receiving unit 130. As to the candidate file information and the display data generated from the candidate file information will be described later.

The display data generating unit 150 supplies to the projection unit 160 one of either the display data generated from the image data supplied from the video image receiving unit 120 or the display data generated from the file information generated from the candidate file information. The projection unit 160 projects an image according to the supplied display data onto the screen 300.

The candidate file information receiving unit 130 is also connected to the operation control unit 140. The operation control unit 140 obtains user's instruction given with the remote controller 102 which is provided with the projector 100. The obtained user's instruction is sent to the device connected to the LAN via the candidate file information receiving unit 130 and the network controller 110.

The personal computer 200 has a network controller 210, a projector connection processing unit 220, a frame buffer 230, an application execution unit 240, and a file system 250 stored in a recording medium. The projector connection processing unit 220 includes a video image sending unit 222, an application execution control unit 224, a candidate file information sending unit 226, and a candidate file information generating unit 228. The video image sending unit 222, the application execution control unit 224, and the candidate file information sending unit 226 of the projector connection processing unit 220 are connected to the LAN via the network controller 210. Between these units 222, 224 and 226, and the video image receiving unit 120 and the candidate file information receiving unit 130 of the projector 100, various data is transferred. Since the projector connection processing unit 220 is used for sending various data to the projector 100, the projector connection processing unit 220 may also be called a "host application program".

A plurality of application data files AD (hereinafter, also termed "application data AD") used by the application execution unit 240 are stored in the file system 250. The application execution unit 240 executes the application program corresponding to application data AD to be used for presentation. The application program displays an image on the computer display (not illustrated) of the personal computer 200 by interpreting the application data AD and providing drawing instruction to the device driver (not illustrated) for screen display. The image data representing the display image on the computer display (PC screen data) is captured by using a mirror driver and so on, and stored in the frame buffer 230. Here, the mirror driver is a type of device driver that captures the drawing instruction for generating the display image and generates image data based on the captured drawing instruction. In this specification, execution of an application program corresponding to the application data AD in this way is also called "using the application data AD" or "executing the application data AD."

The video image sending unit 222 of the projector connection processing unit 220 is connected to the frame buffer 230 of the personal computer 200. The video image sending unit 222 captures the PC screen data stored in the frame buffer 230, and sends the captured PC screen data to the video image receiving unit 120 of the projector 100 via the LAN. By the video image receiving unit 120 of the projector 100 supplying the PC screen data to the display data generating unit 150, the projection unit 160 projects the screen displayed on the computer display of the personal computer 200 (PC screen). In this way, the PC screen is displayed on the projector 100 with the video image receiving unit 120, the display data generating unit 150, and the projection unit 160. So these units 120, 150, and 160 can also be referred to together as the "PC screen capturing unit." The PC screen data undergoes compression processing by a predetermined method (e.g. MPEG-2), and is transferred from the personal computer 200 to the projector 100.

The application execution control unit 224 controls execution of the application program executed by the application execution unit 240 based on messages supplied via the LAN. With this embodiment, the projector 100 sends an action request message to the application execution control unit 224 according to Simple Object Access Protocol (SOAP). When the application execution control unit 224 receives the action request message, the application execution control unit 224 controls the application execution unit 240, and the application program is executed on the personal computer 200 according to the action request message.

In the historical usage data RD stored in the file system 250, the historical usage data of the application data AD is registered. In the historical usage data RD, of the plurality of application data AD stored in the file system 250, information for specifying recently used application data AD is registered. In other words, the application data AD selected in sequence of shorter elapsed time from the final usage is registered in the historical usage data RD. Generally, this kind of historical usage data RD is automatically generated by the operating system (OS) running on the personal computer 200. It is also possible to separately provide a history data generating unit that generates the historical usage data RD.

Figure 2:
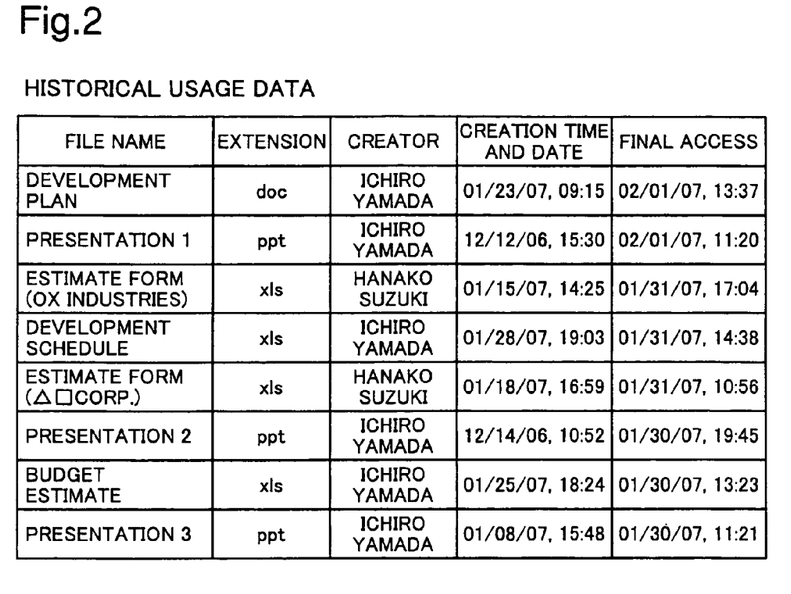
FIG. 2 is an explanatory drawing showing an example of information registered in the historical usage data.

FIG. 2 is an explanatory drawing showing an example of information registered in the historical usage data RD. In the historical usage data, the file name and extension for specifying the application data AD, the name of the creator of the application data, the creation date and time of the application data, and the last time at which the application data has been accessed (final access). As long as information that specifies the application data AD is contained in the historical usage data RD, it is also possible to register information different from the information shown in FIG. 2 into the historical usage data RD. Also, it is possible to omit at least one of the creator name, the creation date and time, and the final access is omitted, and to register other information (e.g. modifier or frequency of usage).

The candidate file information generating unit 228 of FIG. 1 refers the historical usage data RD shown in FIG. 2 and extracts the application data AD that matches the extraction conditions set in advance with the personal computer 200. Then, the information registered in the historical usage data RD regarding one file among the extracted application data AD and a thumbnail image generated from that application data AD are supplied to the candidate file information sending unit 226 as the candidate file information. As the thumbnail image, it is possible to use an image that represents the first image displayed by the application executing unit 240 using the application data AD, for example. The candidate file information generating unit 228 can also supply information, which does not contain a thumbnail image, to the candidate file information sending unit 226 as the candidate file information. The candidate file information sending unit 226 sends the candidate file information supplied from the candidate file information generating unit 228 to the candidate file information receiving unit 130.

Figure 3:
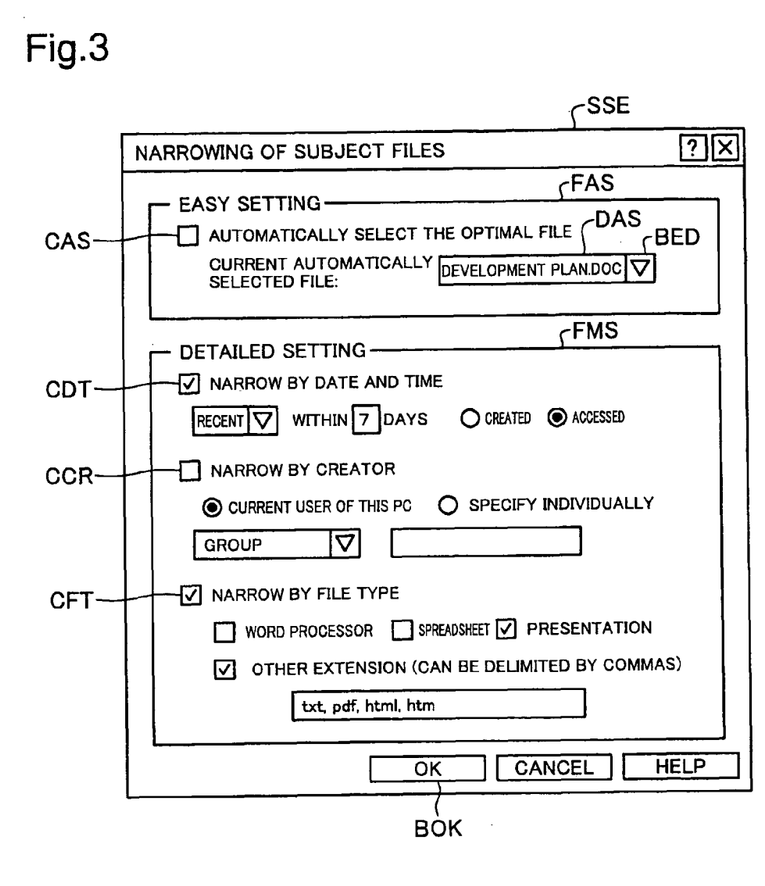
FIG. 3 is an explanatory drawing showing an example of the extraction condition setting screen for setting the extraction conditions.

FIG. 3 is an explanatory drawing showing an example of the extraction condition setting screen SSE for setting the extraction conditions with the personal computer 200. This extraction condition setting screen SSE is generated by the candidate file information generating unit 228, and is displayed on the computer display of the personal computer 200. The extraction condition setting screen SSE has two setting fields of the "EASY SETTING" field FAS and "DETAILED SETTING" field FMS. The user operates these fields FAS and FMS using a pointing device such as a mouse. Then, by the user operating the "OK" button BOK of the extraction conditions setting screen SSE, the application data AD extraction conditions are set.

The "EASY SETTING" field FAS of the extraction conditions setting screen SSE has a check box CAS for specifying extraction with preset extraction conditions and a display area DAS for displaying files extracted with the preset extraction conditions. At the right side of the display area DAS, an display expansion button BED for doing expanded display of the extracted file is provided. When the user operates the display expansion button BED, a list of extracted files is displayed facing downward from the display area DAS. With the example of FIG. 3, since a checkmark is not put in the check box CAS, the extraction conditions set with the "DETAILED SETTING" field FMS are used.

The "DETAILED SETTING" field FMS of the extraction conditions setting screen SSE has check boxes CDT, CCR, and CFT for specifying the extraction conditions. By the user put a checkmark in these check boxes, the conditions corresponding to the check boxes CDT, CCR, and CFT are added to the extraction conditions respectively. With the example in FIG. 3, a checkmark is put in the check boxes CDT and CFT, and no check mark is put in the check box CCR. As a result, the file extraction is performed based on the date and time and the file type. In specific terms, among the files accessed in the last seven days, presentation software files (files with the extension "PPT") or files having another extension (one of "TXT," "PDF," "HTML," or "HTM") are extracted.

Figure 4A:
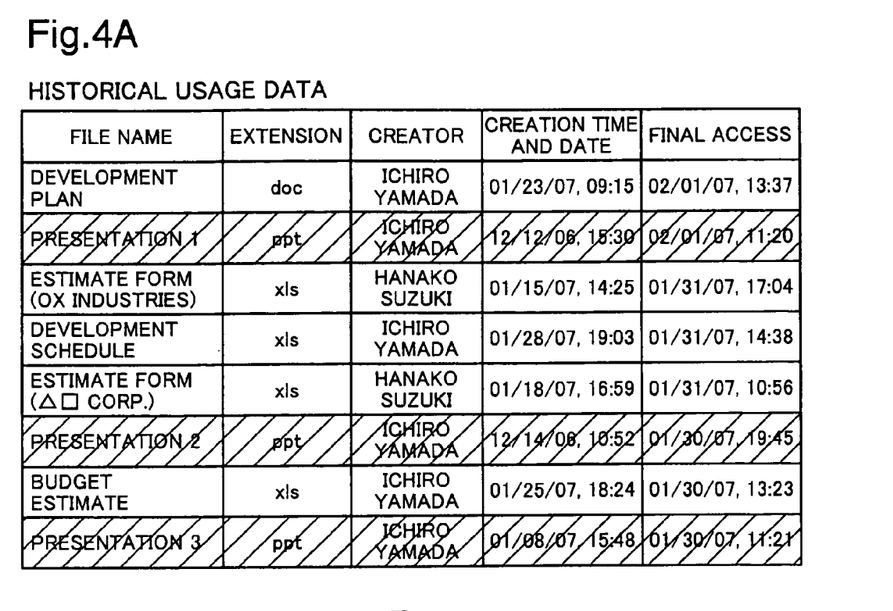
FIGS. 4A and 4B illustrate generation of candidate file information from the historical usage data.
Figure 4B:
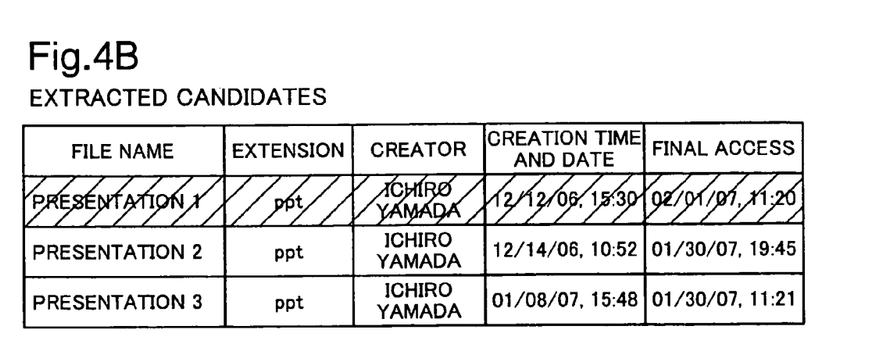

FIGS. 4A and 4B illustrate generation of candidate file information by the candidate file information generating unit 228 (FIG. 1) from the historical usage data RD. In FIG. 4A, among the files registered in the historical usage data shown in FIG. 2, files matching the extraction conditions, which are set with the extraction conditions setting screen SSE of FIG. 3, are hatched. In specific terms, the three files "PRESENTATION 1," "PRESENTATION 2," and "PRESENTATION 3" with the extension "PPT" are files matching the extraction conditions.

FIG. 4B shows a list of the application data AD extracted from the historical usage data RD (extracted candidates). The candidate file information generating unit 228 of FIG. 1 selects one file of the extracted candidates (e.g. the uppermost file within the extracted candidates) as indicated by hatching. The information related to the files selected in this way (i.e. the candidate file information) is sent to the candidate file information receiving unit 130 of the projector 100 (FIG. 1) via the candidate file information sending unit 226.

Figure 5:
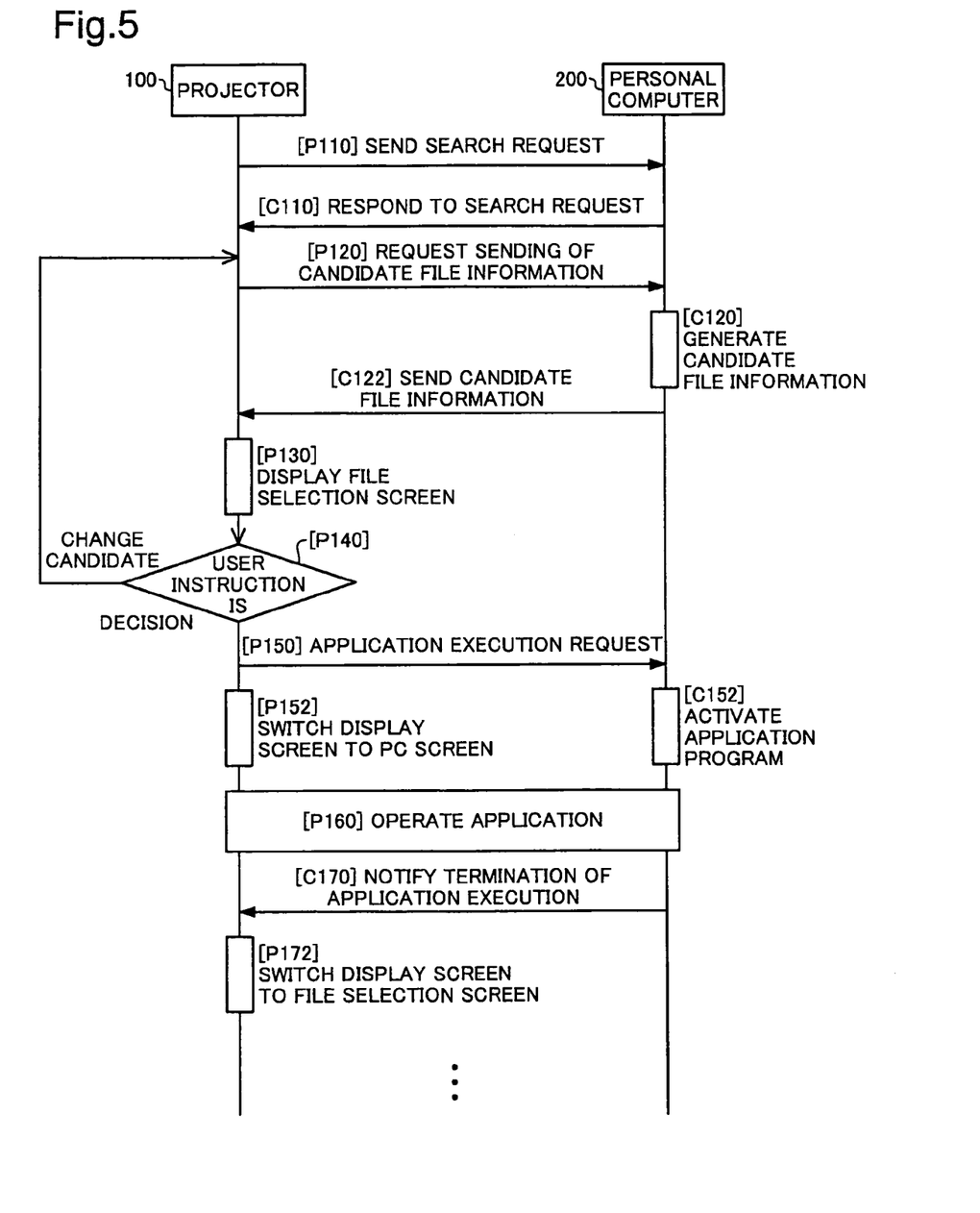
FIG. 5 is a sequence diagram showing the process flow when a presentation is performed with the image projection system.
Figure 6A:
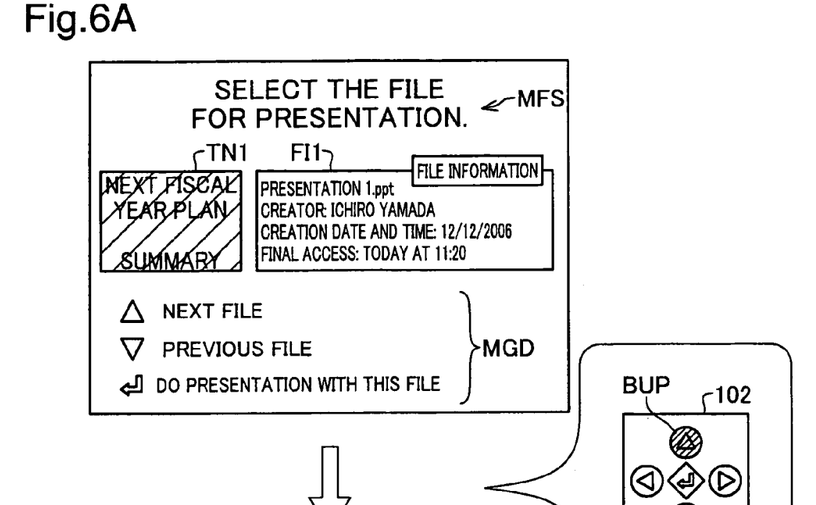
FIGS. 6A and 6B show an example of an image projected by the projector when the sequence of FIG. 5 is executed.
Figure 6B:
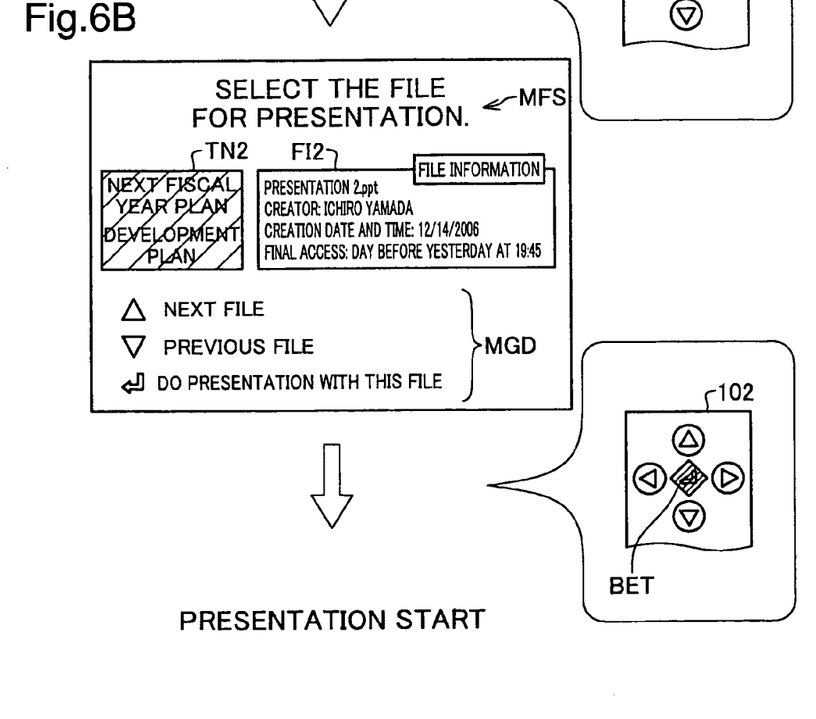

FIG. 5 is a sequence diagram showing the process flow when a presentation is performed with the image projection system (FIG. 1) of this embodiment. FIGS. 6A and 6B show an example of an image projected by the projector 100 when the sequence of FIG. 5 is executed. Execution of the sequence shown in FIG. 5 starts in response to the activation of the projector 100. The personal computer 200 is in an operating state at the time that the sequence of FIG. 5 starts.

At step [P110], the projector 100 sends a search request to the personal computer 200. In specific terms, the network controller 110 of the projector 100 sends a UPnP discovery message multicastly. The multicastly sent discovery message is received by the network controller 210 of the personal computer 200.

At step [C110], the personal computer 200 responds to the search request received at step [P110]. In specific terms, the network controller 210 of the personal computer 200 sends the response message to the network controller 110 of the projector 100. In this way, by the network controller 110 of the projector 100 receiving the response message, a logical connection between the projector 100 and the personal computer 200 is established.

At step [P120], the projector 100 requests the personal computer 200 to send the candidate file information. In specific terms, the candidate file information receiving unit 130 of the projector 100 sends a message requesting send of the candidate file information (hereinafter, also simply called "sending request") to the personal computer 200 via the network controller 110. The candidate file information sending unit 226 of the personal computer 200 receives the sending request via the network controller 210. The received sending request is supplied to the candidate file information generating unit 228.

At step [C120], the candidate file information generating unit 228 of the personal computer 200 generates candidate file information from the historical usage data RD as described above. At step [C122], the generated candidate file information is sent to the projector 100 via the candidate file information sending unit 226 and the network controller 210. The candidate file information sent to the projector 100 is supplied to the display data generating unit 150 via the candidate file information receiving unit 130.

At step [P130], the display data generating unit 150 of the projector 100 (FIG. 1) generates a file selection screen for selecting the application data AD. The display data representing the file selection screen is supplied to the projection unit 160 and the file selection screen is displayed by the projector 100. In this way, the file selection screen is generated and displayed by the display data generating unit 150 and the projection unit 160, so it is possible to refer to both the display data generating unit 150 and the projection unit 160 together as the "selection screen display unit."

FIG. 6A shows the file selection screen SP1 displayed at step [P130]. The message MFS showing that the file to be used in the presentation has been selected, the thumbnail image TN1, the file information FI1, and the guide message MGD that explains the operating method at the remote controller 102 are displayed on the file selection screen SP1. It is also acceptable as long as at least one of the thumbnail image or the file information is displayed on the file selection screen. In this case, the display item may also be set by the user.

At step [P140] of FIG. 5, the candidate file information receiving unit 130 of the projector 100 (FIG. 1) obtains the user's instructions given by the remote controller 102 via the operation control unit 140. Then, it is determined whether the user's instruction is either decision instruction for representing decision to use the selected file for the presentation, or candidate change instruction for changing the candidate. If the user's instruction is decision instruction, the process advances to the step [P150]. Meanwhile, if the user's instruction is candidate changing instructions, the process goes back to the control unit step [P120].

With the example in FIGS. 6A and 6B, during the file selection screen SP1 shown in FIG. 6A is displayed, the user operates the upper button BUP (indicated by hatching) of the remote controller 102. As a result, the process goes back to step [P120], and a request is made to send the information relating to the next file as the candidate file information. By doing this, of the extracted candidates (FIG. 4B), the information relating to the second application data AD is sent to the projector 100 from the personal computer 200. Thus, the file selection screen SP2 shown in FIG. 6B is displayed with the projector 100. In the file selection screen SP2, the thumbnail image TN1 and the file information FI1 in the file selection screen SP1 shown in FIG. 6A are respectively replaced with the thumbnail TN2 and the file information FI2 of the next file (PRESENTATION 2).

Next, the user operates the enter button BET (indicated by hatching) of the remote controller 102 during the file selection screen SP2 shown in FIG. 6B is displayed. As a result, at step [P140] of FIG. 5, it is determined that the user's instruction is decision instruction, and the process advances to step [P150].

At step [P150], the candidate file information receiving unit 130 of the projector 100 (FIG. 1) requests the personal computer 200 (FIG. 1) to start the presentation. In specific terms, the candidate file information receiving unit 130 specifies the selected application data AD (PRESENTATION 2), and sends an action request message requesting execution of the application program to the personal computer 200. In this way, the candidate file information receiving unit 130 instructs the personal computer 200 to execute the application data AD. So the candidate file information receiving unit 130 can also be called the "presentation execution instruction unit."

Subsequently, after the presentation start request at step [P150], the projector 100 starts display of the PC screen at step [P152]. In specific terms, instead of the display image data generated from the candidate file information, the display data generating unit 150 supplies the display image data generated from the PC screen data supplied from the video image receiving unit 120 to the projection unit 160.

The action request message sent to the personal computer 200 is transferred to the application execution control unit 224. At step [C152], the application execution control unit 224, which receives the action request message, activates the application program that uses the application data AD (PRESENTATION 2). With the personal computer 200 in which the application program is activated, the application execution screen is stored in the frame buffer 230. The projector 100 displays the application execution screen according to the application execution screen sent to the projector 100 via the video image sending unit 222.

At step [P160] of FIG. 5, the user operates various buttons formed on the remote controller 102 (FIGS. 6A and 6B). The application executed by the application execution unit 240 is operated according to the users operation of the buttons. In specific terms, button operation of the remote controller 102 is obtained by the operation control unit 140 (FIG. 1). The operation control unit 140 sends information on the button operation to the personal computer 200 (FIG. 1). The information on the button operation sent to the personal computer 200 is supplied to the application execution unit 240. The application executed by the application execution unit 240 is operated according to the operation of buttons in the same way as the operation of a mouse (not illustrated) with the personal computer 200. With this embodiment, by the remote controller 102 sending the information on the button operation to the personal computer 200, the application operation is performed. It is also possible to operate the application by operating a device provided on the personal computer 200, such as a mouse and a keyboard. Further, it is also possible to enter text by operating software keyboard at the projector 100 in the same way as the operation of the keyboard (not illustrated) with the personal computer 200.

When execution of the application at step [P160] terminates, at step [C170], the personal computer 200 notifies the projector 100 that the presentation has ended. In specific terms, when the application execution control unit 224 detects termination of application execution by the application execution unit 240, the application execution unit 240 sends a predetermined message representing the end of the presentation to the projector 100. After the end of the presentation is notified at step [C170], at step [P172], the projector 100 ends display of the PC screen and displays the file selection screen SP2 (FIG. 6B). In specific terms, instead of the display image data generated from the PC screen data, the display data generating unit 150 supplies the display image data generated from the candidate file information to the projection unit 160.

In this way, with this embodiment, during selection of the application data AD to be used for the presentation (file subject to presentation), display of the PC screen is suppressed, and the file selection screen is displayed by the projector 100. Because of this, it is possible to suppress the display of information that is not desirable to be displayed by the projector 100.

B. Variations

The present invention is not limited to the embodiment hereinabove and may be reduced to practice in various forms without departing the scope thereof including the following variations, for example.

B1. Variation 1

In the embodiment hereinabove, the file subject to presentation is selected from the application data AD stored in the file system 250 of the personal computer 200. Also, the file subject to presentation may be selected from the application data AD stored in another network device connected to the LAN. In this case, the application data AD is specified using the Uniform Resource Identifier (URI) or the Uniform Resource Locator (URL) of the application data AD.

When using the application data AD stored in the network device, the personal computer 200 may obtain the application data AD directly from the network device, or may obtain the application data AD via the projector 100. When the personal computer 200 obtains the application data via the projector 100 and verification is necessary for the obtainment, the verification is performed on the personal computer 200. In this case, until execution of the application data AD on the personal computer 200 is started, the display of the PC screen on the projector 100 is suppressed.

B2. Variation 2

In the embodiment hereinabove, the candidate file information generating unit 228 generates candidate file information based on the historical usage data RD. The candidate file information may also be generated based on information other than the historical usage data RD. For example, it is also possible to generate the candidate file information based on the file information stored in a specific folder. However, it is preferable to generate the candidate file information based on the historical usage data RD, because it may spare the trouble of searching the specific folder from the plurality of folders. Further, in general, the file used for the presentation is also used at a time close to the time of the presentation. Because of this, by generating the candidate file information based on the historical usage data RD, it is possible to more easily select the file to be used for the presentation.

B3. Variation 3

In the embodiment hereinabove, the candidate file information generating unit 228 extracts files from the files registered in the historical usage data RD with the previously set extraction conditions, and candidate file information is generated relating to one file among the extracted files. It is also possible to omit extraction of the file. However, by performing file extraction, it is possible to more reliably suppress information undesirable to display with the projector 100.

B4. Variation 4

In the embodiment hereinabove, the extraction conditions are set on the personal computer 200. It is also possible to set the extraction conditions with the projector 100. The extraction conditions set with the projector are notified from the projector 100 to the personal computer 200. However, in this case, depending on setting of the extraction condition, there is the risk that information undesirable to display with the projector 100 (such as a user name) may be displayed. Therefore, it is much preferable to set the extraction conditions at the personal computer 200.

B5. Variation 5

In the embodiment hereinabove, the candidate file information relating to one file is sent from the personal computer 200 to the projector 100. It is also possible to send information relating to a plurality of files. In general, information for selecting the file subject to presentation (selection candidate information), which is sent from the personal computer 200 to the projector 100, may be altered arbitrarily, as long as the information relates selection candidates to be selected as the presentation subject files. In the case of sending information relating to a plurality of files, it is also possible that the projector 100 performs the file extraction performed by the candidate file information generating unit 228 instead.

B6. Variation 6

In the embodiment hereinabove, the personal computer 200 sends the PC screen data to the projector 100 via the LAN. It is also possible to send the PC screen data to the projector 100 in another way. The personal computer 200 may also send the PC screen data to the projector 100 via a communication link compliant with Universal Serial Bus (USB) or IEEE 1394, for example.

B7. Variation 7

In the embodiment hereinabove, PC screen data representing the PC screen displayed on the personal computer 200 is generated, and by sending the generated PC screen data to the projector 100, the PC screen is displayed on the projector 100. It is also possible to display the PC screen on the projector 100 in another way. For example, it is also possible to display the PC screen on the projector 100 by sending analog video signal or digital video signal which represents the PC screen to the projector 100. The transmission channel of these video signals from the personal computer 200 to the projector 100 may also be termed the "image transmission channel" that transmits the PC screen.

B8. Variation 8

In the embodiment hereinabove, the present invention is applied to a projector. The present invention is also applicable to any image display apparatus other than a projector such as a liquid crystal display and a plasma display, as long as the image display apparatus is apparatus for presentation that is capable of presenting images to a plurality of viewers. Note that as the projector, it is possible to apply the present invention to a projector using various modulation devices such as a liquid crystal light bulb, a Digital Micro-mirror Device (DMD: trademark of Texas Instruments Corp.) and so on.

The present invention is has been described with the embodiment hereinabove. The configuration of the embodiment may also be modified as follows. For example, the projector may be configured to display a computer drawing screen drawn by the personal computer without using the application data AD. It is not necessary to constitute the projector 100 and the personal computer 200 as UPnP compatible devices as long as the projector 100 can execute the designated process on the personal computer 200.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image display apparatus for presentation connectable to a computer comprising:
   a candidate information obtaining unit configured to obtain selection candidate information relating to one or more selection candidates for a presentation subject file, the selection candidate information being generated by the computer;
   a selection screen display unit configured to generate and display a selection screen for selecting the presentation subject file based on the selection candidate information, the selection candidate information obtained by the candidate information obtaining unit;
   a presentation execution instruction unit configured to make the computer to execute the selected presentation subject file by sending selection results with the selection screen to the computer; and
   a drawing screen display unit configured to capture and display a computer drawing screen drawn by the computer;
   wherein the image display apparatus displays the selection screen without displaying the computer drawing screen when a connection with the computer is established, and displays the computer drawing screen when drawing by the computer executing the selected presentation subject file is started;
   the image display apparatus and the computer are connected by an image transmission channel and an information transmission channel separate from the image transmission channel, the image transmission channel being configured to transmit the computer drawing screen, and the information transmission channel being configured to transmit information other than the computer drawing screen; and
   the image display apparatus suppresses display of the computer drawing screen until start of drawing by the computer executing the selected presentation subject file, even if the computer drawing screen is supplied from the image transmission channel.

2. The image display apparatus according to claim 1, wherein
   the selection candidate information is generated so as to show a specific type of file selected in order of shorter elapsed time from final usage of the file by the computer.

3. The image display apparatus according to claim 1, wherein
   the selection candidate information is generated based on one or more extracted candidates, the extracted candidates extracted by the computer according to an extraction condition set in advance.

4. The image display apparatus according to claim 3, wherein the extraction condition is set with the computer.

5. A display method for performing display according to a presentation subject file in an image display apparatus for presentation, the image display apparatus being connectable to a computer, the display method comprising:
  (a) obtaining selection candidate information relating to one or more selection candidates for the presentation subject file, the selection candidate information being generated by the computer;
  (b) generating and displaying a selection screen for selecting the presentation subject file based on the selection candidate information without displaying a computer drawing screen drawn by the computer, the selection candidate information being obtained at the step (a);
  (c) making the computer, by sending selection results with the selection screen to the computer, to execute the selected presentation subject file and to draw a presentation screen; and
  (d) capturing and displaying the presentation screen drawn by the computer;

wherein the image display apparatus and the computer are connected by an image transmission channel and an information transmission channel separate from the image transmission channel, the image transmission channel being configured to transmit the presentation screen, and the information transmission channel being configured to transmit information other than the presentation screen; and the image display apparatus suppresses display of the presentation screen until start of drawing by the computer executing the selected presentation subject file, even if the presentation screen is supplied from the image transmission channel.

* * * * *